United States Patent
Smith et al.

(10) Patent No.: US 11,498,054 B2
(45) Date of Patent: Nov. 15, 2022

(54) METAL TRAP FOR USE IN FLUID CATALYTIC CRACKING (FCC)

(71) Applicant: BASF Corporation, Florham Park, NJ (US)

(72) Inventors: Gary M. Smith, Iselin, NJ (US); Bilge Yilmaz, Iselin, NJ (US)

(73) Assignee: BASF CORPORATION, Florham Park, NJ (US)

( * ) Notice: Subject to any disclaimer, the term of this patent is extended or adjusted under 35 U.S.C. 154(b) by 56 days.

(21) Appl. No.: 16/762,472

(22) PCT Filed: Nov. 8, 2018

(86) PCT No.: PCT/US2018/059845
§ 371 (c)(1),
(2) Date: May 7, 2020

(87) PCT Pub. No.: WO2019/094603
PCT Pub. Date: May 16, 2019

(65) Prior Publication Data
US 2020/0346189 A1   Nov. 5, 2020

Related U.S. Application Data

(60) Provisional application No. 62/584,244, filed on Nov. 10, 2017.

(51) Int. Cl.
| | | |
|---|---|---|
| *B01J 23/10* | (2006.01) | |
| *B01J 29/06* | (2006.01) | |
| *B01J 35/08* | (2006.01) | |
| *B01J 35/10* | (2006.01) | |
| *C10G 11/05* | (2006.01) | |
| *C10G 11/18* | (2006.01) | |
| *B01J 21/16* | (2006.01) | |
| *B01J 35/02* | (2006.01) | |
| *C10G 25/00* | (2006.01) | |

(52) U.S. Cl.
CPC .............. *B01J 23/10* (2013.01); *B01J 21/16* (2013.01); *B01J 29/061* (2013.01); *B01J 35/023* (2013.01); *B01J 35/08* (2013.01); *B01J 35/1038* (2013.01); *C10G 11/05* (2013.01); *C10G 11/18* (2013.01); *B01J 2229/20* (2013.01); *C10G 25/003* (2013.01); *C10G 2300/205* (2013.01); *C10G 2300/70* (2013.01)

(58) Field of Classification Search
CPC . B01J 21/16; B01J 23/10; B01J 29/061; B01J 37/0045; B01J 35/023; B01J 35/08; B01J 35/1038; B01J 35/1047; B01J 35/1042; B01J 2229/20; C10G 2300/70; C10G 25/003; C10G 11/05; C10G 11/18; C10G 2300/205
USPC ........ 502/8, 10, 81, 62, 63, 64, 65; 208/106, 208/113, 121
See application file for complete search history.

(56) References Cited

U.S. PATENT DOCUMENTS

| | | |
|---|---|---|
| 4,465,779 A | 8/1984 | Occelli et al. |
| 4,515,903 A | 5/1985 | Otterstedt et al. |
| 4,549,958 A | 10/1985 | Beck et al. |
| 4,668,124 A | 5/1987 | Pitts et al. |
| 4,921,824 A | 5/1990 | Chin et al. |
| 5,260,240 A | 11/1993 | Guthrie et al. |
| 5,300,469 A | 4/1994 | Deeba et al. |
| 5,364,516 A | 11/1994 | Kumar et al. |
| 6,673,235 B2 | 1/2004 | Harris et al. |
| 6,716,338 B2 | 4/2004 | Madon et al. |
| 6,916,762 B2 | 7/2005 | Shibuya et al. |
| 7,208,446 B2 | 4/2007 | Stamires et al. |
| 7,361,264 B2 | 4/2008 | Vierheilig |
| 7,473,663 B2 | 1/2009 | Jones et al. |
| 7,576,024 B2 | 8/2009 | Jones et al. |
| 7,632,773 B2 | 12/2009 | Zhou et al. |
| 8,372,269 B2 | 2/2013 | Willis et al. |
| 8,633,129 B2 | 1/2014 | Almanza Rubiano et al. |
| 8,633,130 B2 | 1/2014 | Almanza Rubiano et al. |
| 8,932,712 B2 | 1/2015 | Kuvettu et al. |
| 8,986,425 B2 | 3/2015 | Sun et al. |
| 9,029,291 B2 | 5/2015 | Fu et al. |
| 2004/0256290 A1 | 12/2004 | Yamada et al. |
| 2008/0210599 A1 | 9/2008 | O'Connor et al. |
| 2009/0048097 A1 | 2/2009 | Jones et al. |
| 2009/0230023 A1 | 9/2009 | Iino et al. |
| 2012/0067778 A1 | 3/2012 | Sánchez Valente et al. |
| 2013/0005565 A1 | 1/2013 | Shu et al. |
| 2013/0131412 A1 | 5/2013 | Mehlberg et al. |
| 2014/0148632 A1 | 5/2014 | Mehlberg et al. |
| 2015/0175901 A1* | 6/2015 | Fu .......................... C10G 11/18 208/120.01 |
| 2015/0190794 A1 | 7/2015 | Karthikeyani et al. |
| 2015/0273449 A1 | 10/2015 | Stoimenov |
| 2017/0253810 A1 | 9/2017 | Fu et al. |

FOREIGN PATENT DOCUMENTS

WO    WO-2005/058484 A1    6/2005

OTHER PUBLICATIONS

International Search Report and Written Opinion in International Application No. PCT/US2018/059845, dated Feb. 12, 2019.

* cited by examiner

Primary Examiner — Elizabeth D Wood
(74) Attorney, Agent, or Firm — Lowenstein Sandler LLP

(57) ABSTRACT

A metal trap for an FCC catalyst include pre-formed microspheres impregnated with an organic acid salt of a rare earth element.

21 Claims, 3 Drawing Sheets

METAL TRAP FOR USE IN FLUID CATALYTIC CRACKING (FCC)

CROSS-REFERENCE TO RELATED PATENT APPLICATIONS

This application is a U.S. National Phase Application under 35 U.S.C. § 371 of International Application No. PCT/US2018/059845, filed on Nov. 8, 2018, which claims the benefit of United States of America Priority Application No. 62/584,244, filed Nov. 10, 2017, the contents of each of which are incorporated herein by reference in their entirety.

TECHNOLOGY

This application is generally related to catalytic cracking catalysts. More specifically, it is related to catalysts that can trap vanadium species that are otherwise deleterious to the catalyst system.

BACKGROUND

Catalytic cracking is a petroleum refining process that is applied commercially on a very large scale. Most of the refinery gasoline blending pool in the United States is produced by this process, with almost all being produced using the fluid catalytic cracking (FCC) process. In the FCC process, heavy hydrocarbon fractions are converted into lighter products by reactions taking place at high temperatures in the presence of a catalyst, with the majority of the conversion or cracking occurring in the gas phase. In FCC processes, feedstock is injected into the riser section of a FCC reactor, where the feedstock is cracked into lighter, more valuable products upon contacting hot catalyst circulated to the riser-reactor from a catalyst regenerator.

A major breakthrough in FCC catalysts came in the early 1960's, with the introduction of zeolites. These materials were incorporated into the matrix of amorphous and/or amorphous/kaolin materials constituting the FCC catalysts of that time.

Petroleum residue (also known as "resid") is the heavy fraction remaining after distillation of petroleum crudes at atmospheric pressure (atmospheric resid) or at reduced pressure (vacuum resid). Conversion of resids yields the thermodynamically favored, but lower valued products: coke and gaseous hydrocarbons. As a result, gasoline yields are lower in resid FCC processing. These heavier and high sulfur crudes and resids present processing problems in that these heavier crudes invariably also contain much higher metals with accompanying significantly increased asphaltic content. Typical contaminant metals are nickel, vanadium, and iron.

It has long been known that topped crudes, residual oils and reduced crudes with high contaminant metals levels present serious problems, as reducing the selectivity to valuable transportation fuels and as deactivating FCC catalysts. Contaminant metals like iron and nickel catalyze the dehydrogenation of hydrocarbons to form undesired hydrogen and coke.

Because compounds containing vanadium and other metals cannot, in general, be readily removed from the cracking unit as volatile compounds, the usual approach has been to trap and/or passivate these compounds under conditions encountered during the cracking process, that may involve incorporating additives into the cracking catalyst or adding separate additive particles along with the cracking catalyst. These additives combine with the metals and therefore either act as "traps" or "sinks" for mobile vanadium species so that the active component of the cracking catalyst is protected, or passivators for immobile nickel.

It is known to incorporate various types of alumina in the FCC catalyst particle for trapping vanadium and nickel. Examples of this can be found in U.S. Pat. Nos. 6,716,338 and 6,673,235, which add a dispersible boehmite to the cracking catalysts. Upon calcination, the boehmite is converted to a transitional alumina phase, which has been found useful in passivation of nickel and vanadium contaminants in the hydrocarbon feedstock. Meanwhile, high surface area aluminas may also serve to trap vanadium, protecting the zeolite, but not to passivate vanadium, so that the level of contaminant hydrogen and coke remains high.

Vanadium can also be trapped and effectively passivated by using alkaline earth metal-containing traps (Ca, Mg, Ba) and/or Rare earth-based traps. See, e.g., U.S. Pat. Nos. 4,465,779; 4,549,958; 4,515,903; 5,300,469; and 7,361,264. However, these traps are sensitive to sulfur, and sulfur may block active sites for vanadium trapping, thereby making the vanadium traps less effective. U.S. Pat. No. 9,029,291 describes a rare earth element dispersed on to an inert matrix.

However, there remains a need for effective vanadium traps that can reduce the yield of hydrogen, coke, and gaseous hydrocarbons.

SUMMARY

In one aspect, disclosed herein is a metal trap that includes pre-formed microspheres impregnated with an organic acid salt of a rare earth element.

In another aspect, disclosed herein is a fluid catalytic cracking (FCC) catalyst composition that includes: a zeolite component comprising a first microsphere; and a non-zeolitic component comprising pre-formed second microspheres, separate from the first microsphere, and impregnated with an organic acid salt of a rare earth element.

In another aspect, disclosed herein is a fluid catalytic cracking (FCC) catalyst composition that includes: a non-cracking component comprising a first microsphere; and a non-zeolitic component comprising pre-formed second microspheres, separate from the first microsphere, and impregnated with an organic acid salt of a rare earth element.

In another aspect, disclosed herein is a method of preparing a metal trap, the method includes contacting pre-formed microspheres with an organic acid salt of a rare earth element.

In another aspect, disclosed herein is a method of preparing a FCC catalyst composition as described herein in any embodiment, the method includes blending a zeolite component and a non-zeolitic component.

In another aspect, disclosed herein is a method of preparing a FCC catalyst composition as described herein in any embodiment, the method includes blending a non-cracking component and a non-zeolitic component.

In another aspect, disclosed herein is a method of cracking a hydrocarbon feed under fluid catalytic cracking conditions, the method includes contacting the hydrocarbon feed with an FCC catalyst composition described herein in any embodiment.

In another aspect, disclosed herein is a method of passivating and/or trapping at least one metal contaminant from a hydrocarbon oil feed in an FCC unit bed, the method includes contacting the hydrocarbon oil feed with the FCC catalyst composition described herein in any embodiment.

DETAILED DESCRIPTION

Figure 1:
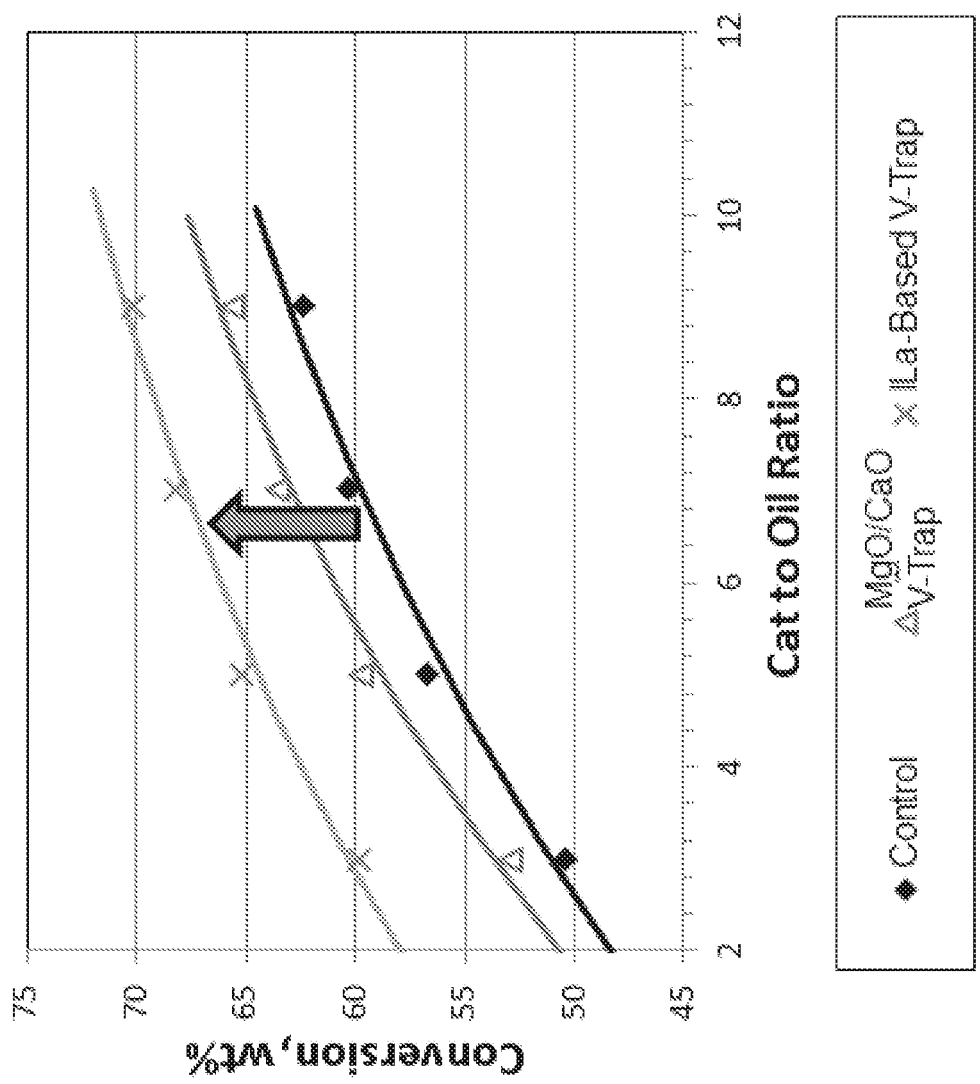
FIG. 1 illustrates the hydrocarbon feedstock conversion (wt. %) versus the catalyst to oil ratio for catalyst samples, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Provided herein is a metal trap for passivation or trapping of metals, such as vanadium, in petroleum feeds. The metal traps include rare earth elements impregnated onto pre-formed microspheres. The rare earth elements are incorporated in the form of an organic acid salt that is formed by reaction of an alkaline salt of the rare earth element with an organic acid. Without being bound by theory, it is believed that the organic acid achieves more uniform incorporation of the rare earth on to the pre-formed microsphere. The metal traps on the pre-formed microspheres are different from other cracking components that may be present on separate microspheres, and the overall composition may be blends of the different microspheres.

Metal Traps

In one aspect, a metal trap is provided that includes pre-formed microspheres impregnated with an organic acid salt of a rare earth element. The metal trap may include at least about 1 wt % of the rare earth element, on an oxide basis. This may include at least about 2 wt %, at least about 5 wt %, at least about 10 wt %, at least about 15 wt %, or at least about 20 wt %, of the rare earth element, on an oxide basis. This may also include from about 1 wt % to about 50 wt %, from about 2 wt % to about 25 wt %, or from about 10 wt % to about 20 wt % of the rare earth element, on an oxide basis.

The rare earth element may include a lanthanide. For example, in some embodiments, the rare element may be lanthanum, cerium, ytterbium, gadolinium, yttrium, neodymium, or a mixture of any two or more thereof. In some further embodiments, the rare earth element is lanthanum, cerium, or a mixture thereof. In particular embodiments, the rare earth element is lanthanum. In particular embodiments, the metal trap may include from about 10 wt. % to about 20 wt. % of lanthanum or cerium, on an oxide basis.

The organic acid salt may be a $C_1$-$C_{10}$ organic acid salt. This may include $C_1$-$C_6$ organic acid salts. Illustrative organic acid salts include, but are not limited to, formate, acetate, or propionate salt. In particular embodiments, the organic acid salt is a formate or acetate salt. In further particular embodiments, the organic acid salt is a formate salt.

Illustrative organic acid salts of the rare earth element may include, but are not limited to, lanthanum formate, lanthanum acetate, cerium formate, or cerium acetate.

The metal trap may be formed by contacting the pre-formed microspheres with the reaction product of an alkaline salt of the rare earth element and an organic acid. In some embodiments, the contacting to form the metal trap includes, but is not limited to, coating, impregnation, spray drying, and the like. In some embodiments, the metal trap may be formed by spray drying the pre-formed microspheres with the reaction product of an alkaline salt of the rare earth element and an organic acid. In some embodiments, the metal trap may be formed by impregnating the pre-formed microspheres with the reaction product of an alkaline salt of the rare earth element and an organic acid. The alkaline salt of the rare earth element may be a carbonate salt. For example, the alkaline salt of the rare earth element may be prepared by reaction of lanthanum carbonate or cerium carbonate with formic acid or acetic acid.

The pre-formed microspheres may include kaolinite, montmorillonite, bentonite, attapulgite, kaolin, amorphous kaolin, metakaolin, mullite, spinel, hydrous kaolin, calcined hydrous kaolin, clay, or a mixture of any two or more thereof. For example, the pre-formed microspheres include calcined hydrous kaolin.

The pre-formed microspheres may have a particle size from about 40-150 microns. In some embodiments, the pre-formed microspheres have a particle size from about 60-100 microns. In particular embodiments, the pre-formed microspheres have a particle size of from about 80 microns. In some embodiments, the pre-formed microspheres are fluidizable microspheres.

The pre-formed microspheres may also be characterized as having a pore volume of at least about 0.10 $cm^3$/gram. Suitable pore volumes include, but are not limited to, at least about 0.10 $cm^3$/gram, at least about 0.15 $cm^3$/gram, at least about 0.20 $cm^3$/gram, at least about 0.25 $cm^3$/gram, at least about 0.30 $cm^3$/gram, at least about 0.35 $cm^3$/gram, at least about 0.40 $cm^3$/gram, at least about 0.45 $cm^3$/gram, or at least about 0.50 $cm^3$/gram. In some embodiments, the pre-formed microspheres may have a pore volume in the range of about 0.10 $cm^3$/gram to about 0.50 $cm^3$/gram.

In another aspect, methods are provided for preparing a metal trap by contacting pre-formed microspheres with an organic acid salt of a rare earth element.

As noted above, contacting to form the metal trap includes, but is not limited to, coating, impregnation, spray drying, and the like. In some embodiments, the contacting is spray drying the pre-formed microspheres with an organic acid salt of a rare earth element. In some embodiments, the metal trap may be formed by impregnating the pre-formed microspheres with an organic acid salt of a rare earth element.

The organic acid salt of the rare earth element may be included in an aqueous medium comprising the organic acid. In some embodiments, the organic salt of the rare earth element is prepared by reacting an alkaline salt of the rare earth element with the organic acid.

As noted above, the rare earth element may include a lanthanide such as, but not limited to, lanthanum, cerium, ytterbium, gadolinium, yttrium, neodymium, or a mixture of any two or more thereof. In particular embodiments, the rare earth element may be lanthanum, cerium, or a mixture thereof. In specific embodiments, the rare earth element is lanthanum.

The alkaline salt of the rare earth element may be a carbonate salt. In particular embodiments, the alkaline salt of the rare earth element is lanthanum carbonate or cerium carbonate.

The organic acid used in the method may be a $C_1$-$C_{10}$ organic acid. Illustrative organic acids are formic acid, acetic acid, or propionic acid. In particular embodiments, the organic acid is formic acid or acetic acid. As such, the organic acid salt of the rare earth element may include lanthanum formate, lanthanum acetate, cerium formate, cerium acetate, or a mixture of any two or more thereof.

In another aspect, a fluid catalytic cracking (FCC) catalyst composition is provided. The FCC catalyst composition includes a zeolite component with a first microsphere and a non-zeolitic component on a second microsphere. The non-zeolitic component may include pre-formed second microspheres impregnated with an organic acid salt of a rare earth element.

The FCC catalyst composition may also include other additives. For example, the FCC catalyst compositions that include the pre-formed second microspheres contacted with an organic acid salt of a rare earth element may also include nickel passivation materials such as boron, boehmite alumina, or phosphorus.

In another aspect, a fluid catalytic cracking (FCC) catalyst composition is provided. The FCC catalyst composition includes a non-cracking component having a first microsphere and a non-zeolitic component with a second microsphere. The non-zeolitic component may include pre-formed second microspheres impregnated with an organic acid salt of a rare earth element.

The FCC catalyst composition may also include other additives. For example, the FCC catalyst compositions that include the pre-formed microspheres contacted with an organic acid salt of a rare earth element may also include nickel passivation materials such as boron, boehmite alumina, or phosphorus.

Methods of Making

With regard to the methods of making the compositions, an active zeolitic component may be incorporated into the microspheres of the catalyst by one of two general techniques. In one technique, the zeolite component is crystallized and then incorporated into microspheres in a separate step. In the second technique, the in-situ technique, microspheres are first formed and the zeolitic component is then crystallized in the microspheres themselves to provide microspheres containing both zeolitic and non-zeolitic components.

The method of making the zeolitic component of the fluid catalytic cracking catalyst may include pre-forming precursor microspheres that include a non-zeolitic material and alumina and in situ crystallizing a zeolite on the precursor microsphere to provide the zeolitic microsphere material. In some embodiments, the in situ crystallizing further includes mixing the precursor microspheres with sodium silicate, sodium hydroxide and water to obtain an alkaline slurry; and heating the alkaline slurry to a temperature and for a time sufficient to crystallize at least about 15% by weight Y-zeolite in the microspheres.

In some embodiments, the FCC catalyst is prepared by blending the zeolite component and the non-zeolitic component. The ratio of the zeolite component and the non-zeolitic component may be varied as needed for various resid feeds.

In some embodiments, the FCC catalyst is prepared by blending the non-cracking component and the non-zeolitic component (i.e. blending of the separate types of microspheres). The ratio of the non-cracking component and the non-zeolitic component may be varied as needed for various resid feeds.

The FCC catalyst composition has a rare earth element present in a range of 0.1 wt. % to about 20.0 wt. % on an oxide basis. In some embodiments, the FCC catalyst composition has a rare earth element present in a range of 0.1 wt. % to about 10.0 wt. % on an oxide basis. the FCC catalyst composition has a rare earth element present in a range of 0.1 wt. % to about 5.0 wt. % on an oxide basis.

Methods of Use

Any of the FCC catalysts and/or metal traps described above can be used in the catalytic cracking of hydrocarbon charge stocks containing metals. Typical feedstocks are heavy gas oils or the heavier fractions of crude oil in which the metal contaminants are concentrated.

A method of cracking a hydrocarbon feed under fluid catalytic cracking conditions is also provided herein. Such methods include contacting the hydrocarbon feed with an FCC composition that includes a zeolite component; and a non-zeolitic component comprising pre-formed microspheres impregnated with an organic acid salt of a rare earth element. The methods may alternatively include contacting the hydrocarbon feed with an FCC composition that includes a non-cracking component; and a non-zeolitic component comprising pre-formed microspheres impregnated with an organic acid salt of a rare earth element.

The non-zeolitic component may be a metal trap that is formed by impregnating pre-formed microspheres with the reaction product of an alkaline salt of the rare earth element and an organic acid. In some embodiments, the alkaline salt of the rare earth element is a carbonate salt. In particular embodiments, the alkaline salt of the rare earth element is prepared by reaction of lanthanum carbonate or cerium carbonate with formic acid or acetic acid.

The present technology also provides a method of passivating and/or trapping at least one metal contaminant from a hydrocarbon oil feed in an FCC unit bed. Such methods include contacting the hydrocarbon oil feed with the FCC catalyst composition, where the composition includes a zeolite component and/or a non-cracking component; and a non-zeolitic component comprising pre-formed microspheres impregnated with an organic acid salt of a rare earth element. In some embodiments, the metal contaminant is vanadium.

The present technology, thus generally described, will be understood more readily by reference to the following examples, which are provided by way of illustration and are not intended to be limiting of the present technology.

EXAMPLES

Example 1

Lanthanum carbonate was dissolved in formic acid and water and spray dried on calcined microspheres to target 10% $La_2O_3$. The material was oven dried and mixed with active catalyst to target 1% lanthanum, measured as the oxide.

Example 2

Evaluation of Samples. The trap components were prepared using pre-formed microspheres with an average particle size of about 80 microns and a pore volume of about 0.22 cc/g. Lanthanum carbonate was dissolved in formic acid and water with mixing to form a solution. Active mixing of the solution was maintained until $CO_2$ release (effervescence) ceased. The mixture was then added to the pre-formed microspheres and thoroughly mixed. Samples were dried at 105° C. and passed through a screen (100 mesh) after drying to eliminate agglomerates and crusting that may have occurred. The traps were blended to 10% lanthanum or 20% lanthanum, when measured as the oxide.

The active cracking catalyst was particle size adjusted for catalytic testing and pre-steamed at 1350° F. for 2 hours in 100% steam. The active catalyst was blended with a particle matrix having little to no catalytic activity and a vanadium trap described in the example above, which was then impregnated (using the Mitchell Method) with 3000 ppm vanadium using vanadium naphthenate. Vanadium impregnated samples having no V-trap (control), MgO/CaO based V-trap (comparative sample), and La-based V-trap according to the present technology are described below in Table 1.

Prior to evaluation, the vanadium impregnated samples were calcined to remove organic materials and resultant carbon from the impregnations. The treated samples were then aged with 90% steam and 10% air at 1500° C. for 5 h to allow vanadium migration. The samples were then evaluated using the ACE method.

TABLE 1

| Sample | Active Cracking Catalyst | Particle Matrix | Trap |
|---|---|---|---|
| Control | 70 wt. % | 30 wt. % | |
| MgO/CaO based V-trap | 70 wt. % | 20 wt. % | 10 wt. % |
| La-based V-trap | 70 wt. % | 20 wt. % | 10 wt. % |

Figure 2:
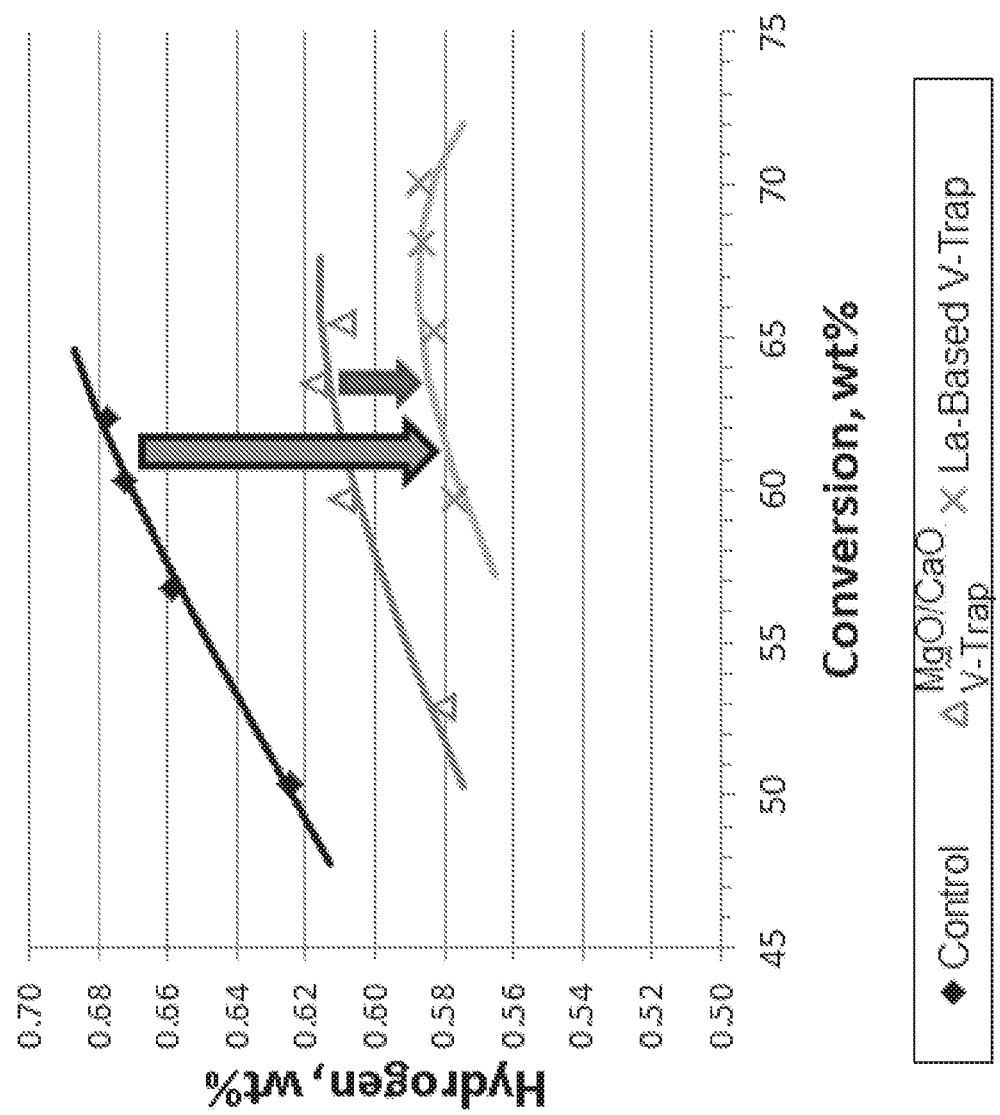
FIG. 2 illustrates the production of hydrogen (wt. %) at a given conversion (wt. %), according to the examples.
Figure 3:
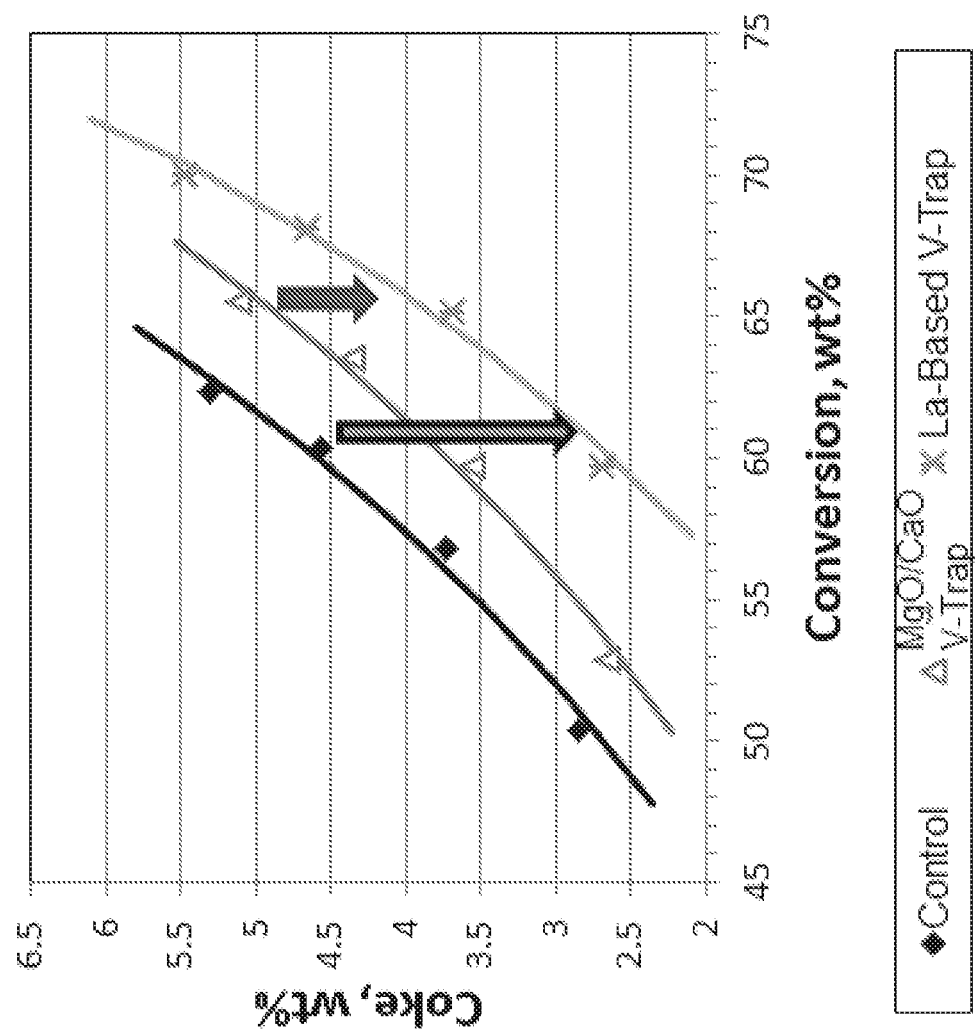
FIG. 3 illustrates the production of coke (wt. %) at a given conversion (wt. %), according to the examples.

Results from the testing of the metal traps are shown in FIGS. 1-3.

FIG. 1, FIG. 2, and FIG. 3 exhibit the overall catalytic conversion (wt. %) of a hydrocarbon feed, $H_2$ yield, and coke yield, respectively, for the catalyst samples described in Table 1. FIG. 1 shows that the catalyst sample having the lanthanum-based vanadium trap according to the present technology showed a 13 wt. % increase in conversion over the control catalyst having no vanadium trap. Similarly, FIG. 1 also showed a higher conversion wt. % over the comparative catalyst sample having a MgO/CaO based vanadium trap. FIGS. 2 and 3 show that the catalyst sample having the lanthanum-based vanadium trap showed a 16% lower $H_2$ and 41% lower coke production than the control catalyst sample (no vanadium trap). In addition, the catalyst sample having the lanthanum-based vanadium trap showed lower $H_2$ and coke production than the comparative catalyst sample having a MgO/CaO based vanadium trap. Thus, the present technology exhibits improved catalytic conversion hydrocarbon feedstocks and lower $H_2$ and coke production over other state of the art FCC catalysts.

Para. A. A metal trap comprising pre-formed microspheres impregnated with an organic acid salt of a rare earth element.

Para. B. The metal trap of Para. A, wherein the pre-formed microspheres comprise kaolinite, montmorillonite, bentonite, attapulgite, kaolin, amorphous kaolin, metakaolin, mullite, spinel, hydrous kaolin, calcined hydrous kaolin, clay, or a mixture of any two or more thereof.

Para. C. The metal trap of Para. B, wherein the pre-formed microspheres comprise calcined hydrous kaolin.

Para. D. The metal trap of any one of Paras. A-C, comprising at least 1 wt. % of the rare earth element, on an oxide basis.

Para. E. The metal trap of any one of Paras. A-D, wherein the rare earth element is lanthanum, cerium, ytterbium, gadolinium, yttrium, neodymium, or a mixture of any two or more thereof.

Para. F. The metal trap of any one of Paras. A-E, wherein the rare earth element is lanthanum, cerium, or a mixture thereof.

Para. G. The metal trap of any one of Paras. A-F, wherein the organic acid salt is a formate, acetate, a propionate salt, or a mixture thereof.

Para. H. The metal trap of Para. G, wherein the organic acid salt is a formate salt.

Para. I. The metal trap of Para. G, wherein the organic acid salt of the rare earth element is lanthanum formate, lanthanum acetate, cerium formate, cerium acetate, or a mixture of any two or more thereof.

Para. J. The metal trap of any one of Paras. A-I formed by contacting the pre-formed microspheres with the reaction product of an alkaline salt of the rare earth element and an organic acid.

Para. K. The metal trap of any one of Paras. A-J, wherein, wherein the pre-formed microspheres have a particle size of from about 40-150 microns.

Para. L. The metal trap of any one of Paras. A-K, wherein, wherein the pre-formed microspheres have a particle size of from about 60-100 microns.

Para. M. The metal trap of any one of Paras. A-L, wherein, wherein the pre-formed microspheres have a pore volume of at least about 0.10 $cm^3$/gram.

Para. N. A fluid catalytic cracking (FCC) catalyst composition comprising: a zeolite component comprising a first microsphere; and a non-zeolitic component comprising pre-formed second microspheres, separate from the first microsphere, and impregnated with an organic acid salt of a rare earth element.

Para. O. The FCC catalyst composition of Para. N, wherein the pre-formed second microspheres comprise kaolinite, montmorillonite, bentonite, attapulgite, kaolin, amorphous kaolin, metakaolin, mullite, spinel, hydrous kaolin, calcined hydrous kaolin, clay, or a mixture of any two or more thereof.

Para. P. The FCC catalyst composition of Para. N or OX wherein the rare earth element is lanthanum, cerium, ytterbium, gadolinium, yttrium, neodymium, or a mixture of any two or more thereof.

Para. Q. The FCC catalyst composition of any one of Paras. N-P, wherein the rare earth element is lanthanum, cerium, or a mixture thereof.

Para. R. The FCC catalyst composition of any one of Paras. N-Q, wherein the organic acid salt is a formate, an acetate, or a propionate salt, or a mixture of any two or more thereof.

Para. S. The FCC catalyst composition of Para. R, wherein the organic acid salt is a formate salt.

Para. T. The FCC catalyst composition of any one of Para. R, wherein the organic acid salt of the rare earth element is lanthanum formate, lanthanum acetate, cerium formate, cerium acetate, or a mixture of any two or more thereof.

Para. U. The FCC catalyst composition of any one of Paras. N-T, wherein the rare earth element is present in a range of 0.1 wt % to about 20.0 wt % on an oxide basis.

Para. V. A method of preparing a metal trap, the method comprising contacting pre-formed second microspheres with an organic acid salt of a rare earth element.

Para. W. The method of Para. V, wherein the contacting pre-formed second microspheres with the organic acid salt of a rare earth element is selected from the group consisting of coating, spray drying, and impregnating.

Para. X. The method of Para. V or W, wherein the organic acid salt of the rare earth element is comprised in an aqueous medium comprising the organic acid.

Para. Y. The method of any one of Paras. V-X, further comprising preparing the organic salt of the rare earth element by reacting an alkaline salt of the rare earth element with the organic acid.

Para. Z. The method of any one of Para. Y, wherein the alkaline salt of the rare earth element is a carbonate salt.

Para. AA. The method of any one of Paras. V-Z, wherein the rare earth element is lanthanum, cerium, ytterbium, gadolinium, yttrium, neodymium, or a mixture of any two or more thereof.

Para. AB. The method of Para. AA, wherein the rare earth element is lanthanum, cerium, or a mixture thereof.

Para. AC. The method of any one of Paras. X-AB, wherein the organic acid is formic acid, acetic acid, propionic acid, or a mixture of any two or more thereof.

Para. AD. The method of any one of Paras. X-AC, wherein the organic acid is formic acid.

Para. AE. The method of Para. AD, wherein the organic acid salt of the rare earth element is lanthanum formate, lanthanum acetate, cerium formate, cerium acetate, or a mixture of any two or more thereof.

Para. AF. A method of preparing a FCC catalyst composition of any one of Paras. N-U, the method comprising blending the zeolite component and the non-zeolitic component.

Para. AG. The method of Para. AG, wherein the zeolite component is prepared by a method comprising: pre-forming a precursor first microsphere comprising a non-zeolitic material and alumina; and in situ crystallizing a zeolite on the pre-formed first microsphere to provide the zeolite component.

Para. AH. A method of cracking a hydrocarbon feed under fluid catalytic cracking conditions, the method comprising contacting the hydrocarbon feed with the FCC catalyst composition of any one of Paras. N-U.

Para. AI. A method of passivating and/or trapping at least one metal contaminant from a hydrocarbon oil feed in an FCC unit bed, the method comprising contacting the hydrocarbon oil feed with the FCC catalyst composition of Paras. N-U.

Para. AJ. The method of Para. 34, wherein the at least one metal contaminant is vanadium.

Para. AK. A fluid catalytic cracking (FCC) catalyst composition comprising: a non-cracking component comprising a first microsphere; and a non-zeolitic component comprising pre-formed second microspheres, separate from the first microsphere, and impregnated with an organic acid salt of a rare earth element.

Para. AL. The FCC catalyst composition of Para. AK, wherein the pre-formed second microspheres comprise kaolinite, montmorillonite, bentonite, attapulgite, kaolin, amorphous kaolin, metakaolin, mullite, spinel, hydrous kaolin, calcined hydrous kaolin, clay, or a mixture of any two or more thereof.

Para. AM. The FCC catalyst composition of any one of Paras. AK or AL, wherein the rare earth element is lanthanum, cerium, ytterbium, gadolinium, yttrium, neodymium, or a mixture of any two or more thereof.

Para. AN. The FCC catalyst composition of any one of Paras. AK-AM, wherein the rare earth element is lanthanum, cerium, or a mixture thereof.

Para. AO. The FCC catalyst composition of any one of Paras. AK-AN, wherein the organic acid salt is a formate, an acetate, or a propionate salt, or a mixture of any two or more thereof.

Para. AP. The FCC catalyst composition of Para. AO, wherein the organic acid salt is a formate salt.

Para. AQ. The FCC catalyst composition of Para. AO, wherein the organic acid salt of the rare earth element is lanthanum formate, lanthanum acetate, cerium formate, cerium acetate, or a mixture of any two or more thereof.

Para. AR. The FCC catalyst composition of any one Paras. AK-AQ, wherein the rare earth element is present in a range of 0.1 wt % to about 20.0 wt % on an oxide basis.

Para. AS. A method of preparing the FCC catalyst composition of any one of Paras. AK-AR, the method comprising blending the non-cracking component and the non-zeolitic component.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

While certain embodiments have been illustrated and described, it should be understood that changes and modifications can be made therein in accordance with ordinary skill in the art without departing from the technology in its broader aspects as defined in the following claims.

What is claimed is:

1. A metal trap consisting essentially of pre-formed microspheres impregnated with an organic acid salt of a rare earth element.

2. The metal trap of claim 1, wherein the pre-formed microspheres comprise kaolinite, montmorillonite, bentonite, attapulgite, kaolin, amorphous kaolin, metakaolin, mullite, spinel, hydrous kaolin, calcined hydrous kaolin, clay, or a mixture of any two or more thereof.

3. The metal trap of claim 1, comprising at least 1 wt. % of the rare earth element, on an oxide basis.

4. The metal trap of claim 1, wherein the rare earth element is lanthanum, cerium, ytterbium, gadolinium, yttrium, neodymium, or a mixture of any two or more thereof.

5. The metal trap of claim 1, wherein the organic acid salt is a formate, acetate, a propionate salt, or a mixture thereof.

6. The metal trap of claim 5, wherein the organic acid salt is a formate salt.

7. The metal trap of claim 1, wherein the pre-formed microspheres have a particle size of from about 40-150 microns.

8. The metal trap of claim 1, wherein the pre-formed microspheres have a pore volume of at least about 0.10 $cm^3$/gram.

9. A fluid catalytic cracking (FCC) catalyst composition comprising:
a zeolite component comprising a microsphere; and
a separate non-zeolitic component consisting essentially of pre-formed microspheres impregnated with an organic acid salt of a rare earth element.

10. The FCC catalyst composition of claim 9, wherein the pre-formed microspheres comprise kaolinite, montmorillonite, bentonite, attapulgite, kaolin, amorphous kaolin, metakaolin, mullite, spinel, hydrous kaolin, calcined hydrous kaolin, clay, or a mixture of any two or more thereof.

11. The FCC catalyst composition of claim 9 wherein the rare earth element is lanthanum, cerium, ytterbium, gadolinium, yttrium, neodymium, or a mixture of any two or more thereof.

12. The FCC composition of claim 9, wherein the organic acid salt is a formate, an acetate, or a propionate salt, or a mixture of any two or more thereof.

13. The FCC catalyst composition of claim 9, wherein the rare earth element is present in a range of 0.1 wt % to about 20.0 wt % on an oxide basis.

14. A method of preparing a metal trap of claim 1, the method comprising contacting pre-formed microspheres with an organic acid salt of a rare earth element.

15. The method of claim 14, wherein the contacting step is selected from the groups consisting of coating, spray drying, and impregnating.

16. The method of claim 14, wherein the organic acid salt of the rare earth element is provided in an aqueous medium comprising the organic acid.

17. A method of preparing a FCC catalyst composition according to claim 9, comprising blending the zeolite component and the non-zeolitic component.

18. A method of cracking a hydrocarbon feed under fluid catalytic cracking conditions, the method comprising contacting the hydrocarbon feed with the FCC catalyst composition of claim 9.

19. A method of passivating and/or trapping at least one metal contaminant from a hydrocarbon oil feed in an FCC unit bed, the method comprising contacting the hydrocarbon oil feed with the FCC catalyst composition of claim 9.

20. The method according to claim 18, wherein the at least one metal contaminant is vanadium.

21. A metal trap comprising pre-formed microspheres impregnated with an organic acid salt of a rare earth element, wherein the metal trap is directly mixed with a particle matrix.

* * * * *